Feb. 25, 1941.  M. A. CROZIER  2,233,342
BRACKET CONSTRUCTION FOR PLUMBING FIXTURES
Filed May 14, 1940   2 Sheets-Sheet 1
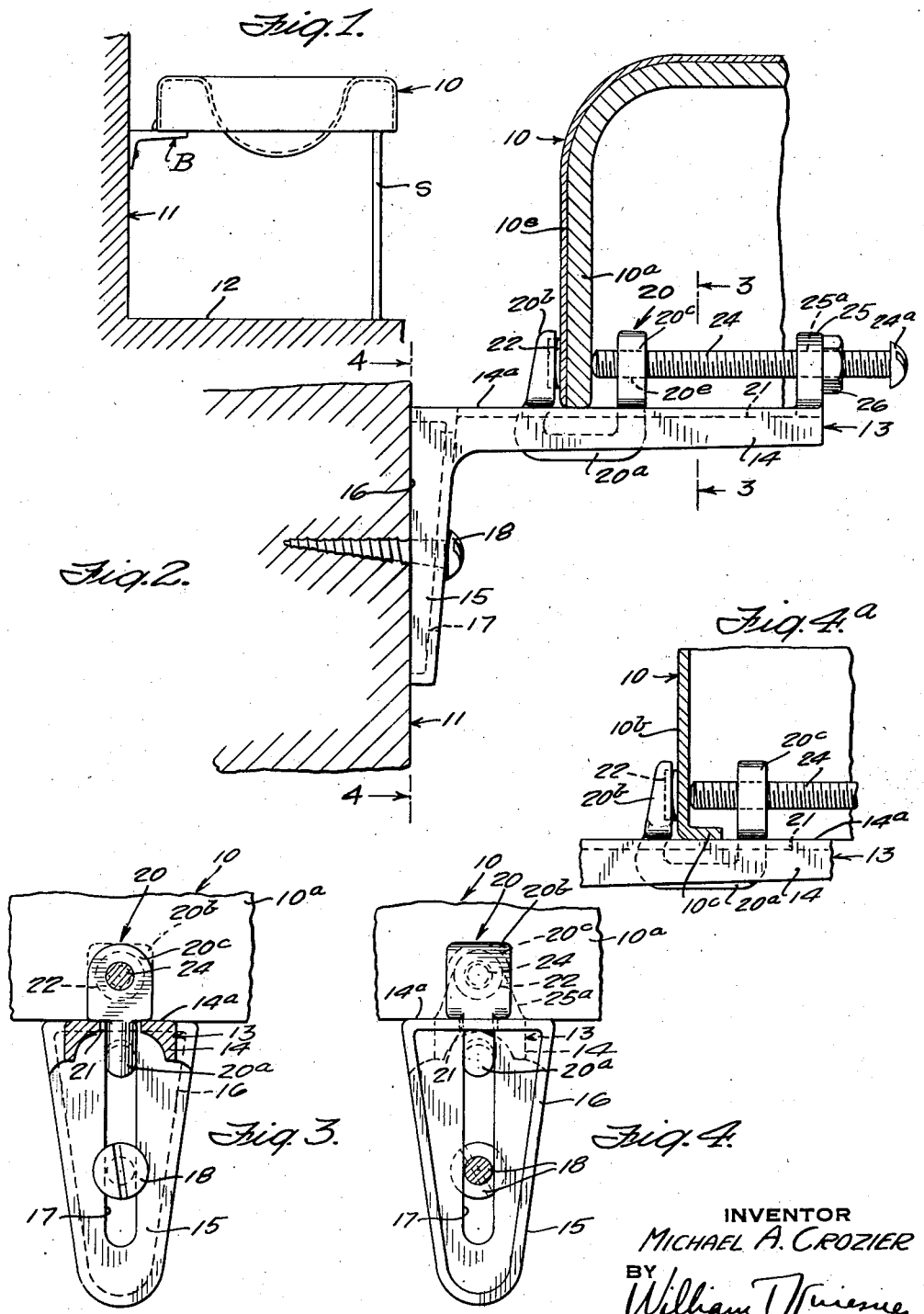
INVENTOR
MICHAEL A. CROZIER
BY
William T. [Wiesner]
ATTORNEY

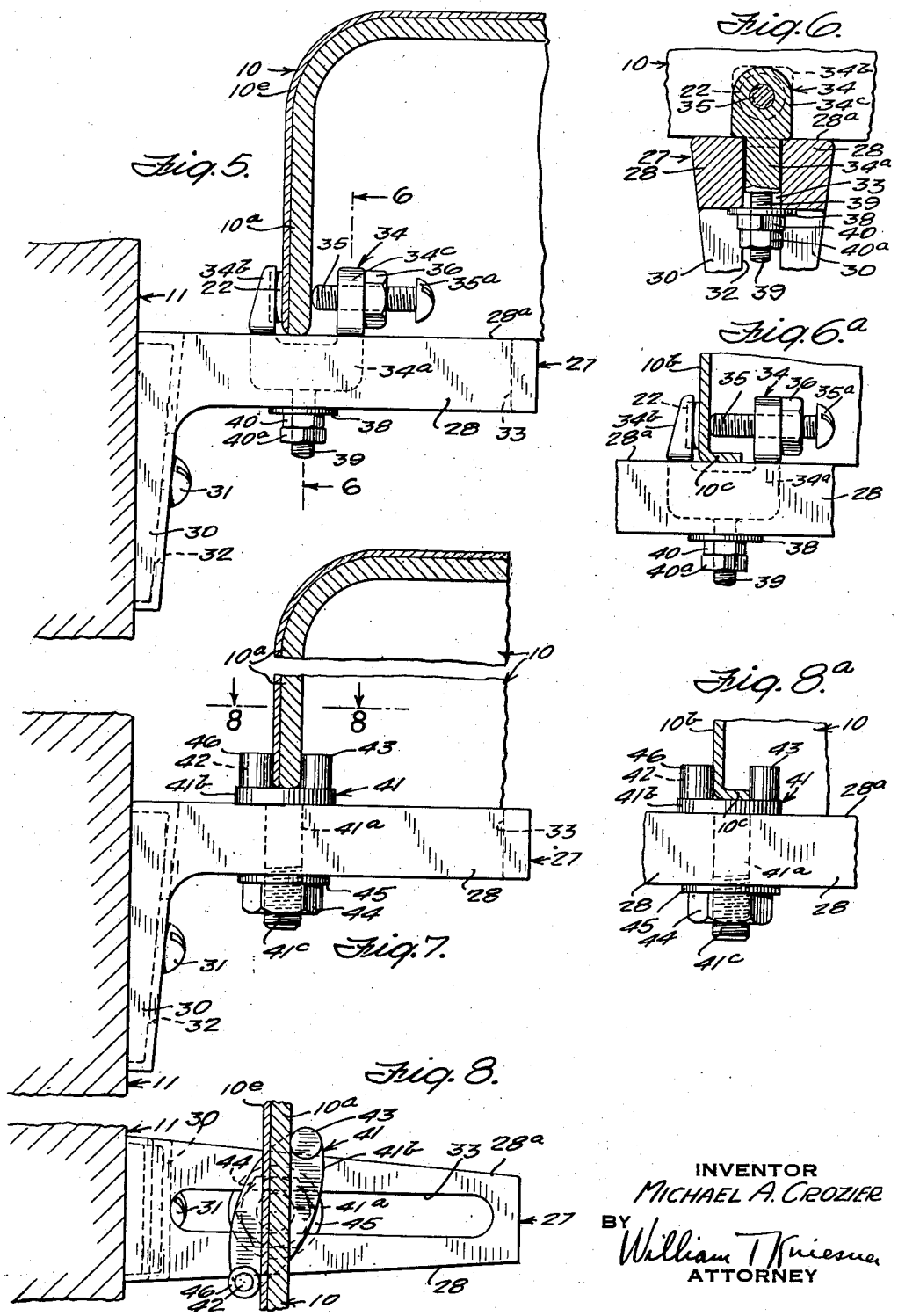

Patented Feb. 25, 1941

2,233,342

UNITED STATES PATENT OFFICE 2,233,342

BRACKET CONSTRUCTION FOR PLUMBING FIXTURES

Michael A. Crozier, Mount Vernon, N. Y., assignor to Crozier Manufacturing Co., Mount Vernon, N. Y., a co-partnership composed of Joseph A. Crozier and Michael A. Crozier Application May 14, 1940, Serial No. 335,032

17 Claims. (Cl. 4—170)

This invention relates to bracket construction, particularly for the support or attachment of plumbing fixtures, such as lavatories, from or to a wall, or the like.

One of the objects of this invention is to provide a practical bracket support for lavatories, or the like, that will be of neat and compact construction yet strong and durable in use. Another object is to provide a bracket construction of the above-mentioned character that will provide a suitable range of flexibility of installation or of interrelation with the lavatory so as to be capable of meeting in a simple and dependable manner the peculiar and widely varying conditions met with in the installation of the fixture and its accompanying piping and related plumbing devices. Another object is to provide a bracket construction for lavatories that will be capable of ready and quick adaptation to the various variables imposed upon the installing of a lavatory by such factors as the cutting and assembling of pipe lengths to suit the relatively fixed locations of pipe openings in the lavatory itself, with accompanying variables as to height of the lavatory, spacing of the latter from the wall, and like factors. Another object is to provide a bracket construction of the above-mentioned nature that will lessen the labor and time involved in installing a plumbing fixture, like a lavatory, sink, or the like.

Another object is to provide a wall bracket construction for supporting a plumbing fixture like a lavatory, sink, or the like, with easily and quickly operable means for attaching the plumbing fixture thereto throughout the range of varying spacings of the plumbing fixture relative to the wall as met with in practice; also to provide such a bracket that will be of inexpensive manufacture, capable of ease and speed of assembly, and easy and convenient to install. Another object is to provide a practical and inexpensive means for achieving wide range of action of the bracket while achieving simplicity of manipulation, security of fastening of the plumbing fixture, and dependable transmission of strains or load to the parts, such as a wall, by which the plumbing fixture is to be supported. Another object is to provide a bracket that will not encumber the space under the plumbing fixture and that will improve the appearance of the installed fixture. Another object is in general to improve bracket constructions for plumbing fixtures and to facilitate and improve the installation of the latter. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which are shown by way of illustration several of the various possible embodiments of my invention—

Figure 1 is a side elevation on a small scale showing an installation of a plumbing fixture, such as a sink or lavatory, by means of my bracket construction;

Figure 2 is a side elevation of one form of bracket construction showing it assembled to a wall and to an illustrative form of plumbing fixture;

Figure 3 is a sectional view as seen along the line 3—3 of Figure 2;

Figure 4 is an end elevation as seen along the line 4—4 of Figure 2;

Figure 4ᵃ is a fragmentary view of the bracket of Figure 2 showing it in coaction with another form of plumbing fixture construction;

Figure 5 is a side elevation of another form of bracket construction showing its interrelation with a plumbing fixture of one form;

Figure 6 is a vertical sectional view as seen along the line 6—6 of Figure 5;

Figure 6ᵃ is a fragmentary view of the bracket of Figure 5 showing its interrelation with another form of plumbing fixture;

Figure 7 is a side elevation of another form of bracket construction showing it related to a wall and to a plumbing fixture;

Figure 8 is a plan view as seen along the line 8—8 of Figure 7, and

Figure 8ᵃ is a fragmentary view of the bracket of Figure 7 showing it with a possible other form of plumbing fixture interrelated therewith.

Similar reference characters refer to similar parts throughout the several views of the drawings.

Referring first to Figure 1, I have indicated generally by the reference character 10 a plumbing fixture usually taking the form of a lavatory, sink, or the like, and intended to be supported usually along or adjacent to a wall 11 and at a suitable height above the floor 12. Such plumbing fixtures have to be provided usually with three pipe connections, such as a drain pipe, a hot water inlet, and a cold water inlet, and usually have three holes or openings to accommodate these pipe connections. With known or heretofore employed bracket supports for such fixtures, the building up of the pipe connections has had to be carried on with time and labor-consuming precision if the pipe connections are to enter the plumbing fixture within the available leeway allowed by the fixedly positioned holes when the plumbing fixture is set upon or onto the pipe connections and still result in such a location of the plumbing fixture relative to the wall 11 and floor 12 that the brackets or other supports are still attachable. Such prior bracket constructions therefore impose upon the plumber such accuracy and precision, step-by-step, in the building up of the installation, as make completion of the installation troublesome, annoying, and expensive. In the more common of such prior practices, lugs are provided on the under side of the lavatory or fixture construction and it is to such lugs that the supporting brackets are attached; it requires but little error or inaccuracy in building up the piping to result in a condition where the brackets, if secured to the wall, are no longer interengageable with the fixedly positioned lugs or other devices on the under side of the plumbing fixture, and such a condition requires taking down one or both of the brackets and resetting them, or changing the location of some or all of the piping, or requires resorting to other expedients, in the endeavor to remedy a circumstance like the one just stated. One of the dominant aims of this invention is to provide a bracket construction in which such deficiencies and disadvantages of prior practice may be overcome in a thoroughly practical, efficient and inexpensive manner.

In Figure 1 I have indicated at B one of the two brackets of my invention that I employ to support the rear end of the pumbing fixture 10 from the wall 11, the front end being supported in any suitable way as, for example, by front legs or standards of which one is shown at S and which may be of any suitable construction usually of adjustable length and usually attachable in any suitable way at their upper ends to the under side of the plumbing fixture 10. The brackets B preferably take the form shown in Figures 2–4.

Turning then to Figures 2–4, the bracket construction preferably comprises the main bracket part 13 which preferably has a horizontal portion 14 of suitable length with a downwardly extending vertical portion 15 at its rear or left-hand end, the latter providing a rear face 16 of suitable length and breadth to rest against the face of the wall 11, the part 15 being of suitable vertical dimension and being provided with suitable means for securing it preferably adjustably to the wall 11. Thus, and preferably, I provide in the part 15 a vertically extending slot 17 through which a securing device, such as a screw 18, may be passed to secure the main bracket part 13 to the wall 11, the slot 17 providing a range of change of position vertically of the bracket part 13 relative to the screw 18 that becomes fixedly fastened in the wall 11.

To understand more readily certain other features of construction and action, let it be assumed that the plumbing fixture 10, such as a lavatory, is constructed to have a peripheral depending flange or apron 10ᵃ, as is usual with one type of such fixtures where they are made of iron, such as a casting and porcelain-enameled upon their exterior faces. According to certain features of my invention, I prefer to have the apron 10ᵃ rest upon or be secured to the bracket portion 14 and to that end the latter is of a length adequate to provide a substantial or appropriate range of change of position in a horizontal direction of the lavatory 10 relative to the wall 11. The upper edge or face 14ᵃ of the bracket portion 14 is therefore plane and, with the bracket secured to the face of the vertical wall 11, the upper face 14ᵃ assumes a horizontal position.

In a preferred form of construction the bracket portion 14 is shaped to provide a guideway or guiding means for a securing device, generally indicated at 20, whereby the latter is shiftable relative to the bracket portion 14; such a guideway preferably comprises a centrally and longitudinally extending slot or channel 21 which, in cross-section, may be of any suitable form, illustratively like that shown in Figure 3, thus giving the two parts of the horizontal bracket portion 14 an angle cross-section and thereby increasing the strength and stiffness thereof relative to the amount of metal in the cross-section.

The device 20 preferably takes the form of a U-shaped member of suitable mass and strength and it is assembled to the bracket portion 14 preferably in such a way that its horizontal portion 20ᵃ, which joins the upright and preferably parallel arm portions 20ᵇ and 20ᶜ thereof, is accommodated within the slot or channel 21 below the plane of the upper face 14ᵃ above which, therefore, there remain exposed the upstanding arm portions 20ᵇ and 20ᶜ; preferably, the latter are enlarged in a direction transverse of the portion 20ᵃ, giving them a head-like shape, as better appears in Figure 3, such construction or arrangement providing also a means to prevent the device 20 from dropping vertically down through the channel or slot 21.

The spacing between the inside faces of the arm portions 20ᵇ and 20ᶜ is sufficient to accommodate therebetween the various thicknesses of flanges or aprons 10ᵃ met with in practice, for the apron 10ᵃ is to be positioned between the two arm portions 20ᵇ and 20ᶜ, as shown in Figure 2. Preferably, the inside face of the arm 20ᵇ carries a suitable cushioning means indicated at 22 and taking the form of preferably a non-metallic means, such as fiber, rubber, or the like, preferably a means having some degree of compressibility or resiliency. Any suitable means may be employed to mount the cushioning means 22 to the inside face of the portion 20ᵇ and in Figure 2 I have indicated one possible arrangement. Thus, the face of the portion 20ᵇ may be recessed to form a seat for the element 22 which may be press-fitted or otherwise, as by an adhesive, secured in position. As better appears in Figure 2, it is the external face of the apron 10ᵃ with which the arm portion 20ᵇ of the device 20 is to engage, and by providing the cushioning element marring or crazing of the finish, such as the porcelain enamel, as at 10ᵉ, may be guarded against.

The juxtaposed arm portion 20ᶜ is provided with a threaded hole 20ᵉ, the axis of which is alined with the midpoint of the inside face of the arm portion 20ᵇ, and in threaded engagement with the hole 20ᵉ is the end portion of a screw 24 which is preferably of a length commensurate with the length of the bracket portion 14 and which is also threaded through a threaded hole 25ᵃ in an upstanding lug extension 25 formed integrally with the bracket portion 14 and preferably closing off the channel or slot 21 at its outer end, thus also forming a reinforcing integral junction between the parts of the bracket portion 14 to either side of the channel 21. The screw 24 has a head 24ᵃ suitably formed to permit turning of the screw, as by a wrench or screwdriver, or other suitable tool, and preferably, also, screw 24 is provided with a locknut 26 to the right of the upstanding bracket end portion 25.

Preferably, as earlier above noted, two such brackets are employed when installing the fixture 10 of Figures 1 and 2. The pipe connections are built up in the usual way, the workman aiming, in this work, at the spaces fixed by the fixedly positioned holes in the fixture and, of course, aiming at a certain height for the fixture 10 above the floor 11 (Figure 1) and also having in mind a spacing of the fixture 10 horizontally from the wall 11. The piping, such as the cold and hot water piping, having been thus built up, two bracket structures are secured in horizontally spaced relation to the wall 11, by means of screws 18, at approximately the desired or intended height of the fixture 10 above the floor 12. The fixture 10 is then set or let down upon the pipe connections which enter the spaced holes provided in the fixture 10 and the apron 10ª at the wall side of the fixture 10 is thus ready to be rested upon the two laterally spaced brackets, the forward end of the fixture 10 being supported in any suitable way, as by the standards S of Figure 1. Preferably, before letting the apron 10ª down upon the two brackets, the screw 24 is unthreaded and disengaged from the device 20 and, if desired, the screw 24 may be backed off somewhat relative to the threaded bracket part 25, thereby releasing the device 20 for free sliding movement lengthwise of the horizontal bracket portion 14. Accordingly, the device 20 on each bracket may be slid into position to receive between its upstanding arm portions 20ᵇ and 20ᶜ the apron 10ª, it being noted that freedom of shifting of the fixture 10 in a direction toward or away from the observer, viewing Figure 2, and relative to the brackets and as may be necessary in letting the fixture down onto the connecting pipes, so that the latter enter the holes in the former, is permitted and greatly facilitates such an initial assembly of the various parts.

Thereupon, even though there has been some lack of precision in building up the piping, or even though such other factors have been created as would in prior structures necessitate disassembly and taking down of the piping and reconstructing it with shorter or longer lengths of pipe, or as would require resort to some other expedients, the two brackets are preferably first shifted vertically to such extent as may be determined by the termini of the pipe connections, whence the securing screw 18 for each bracket is driven home. In this connection, the vertical portion 15 of the bracket 13 (Figure 2) is preferably tapered, that is, its right-hand face makes an angle with the rear face, thus being in cross-section in the form of a wedge. When, therefore, the screw 18 is tightened up, downward shifting of the bracket is counteracted and dependability of load-carrying is assured. For example, should the construction of the wall 11 be such that it might partake of changes, such as shrinkage or swelling, as would have the effect of tending to increase the spacing between the face of the wall and the head of the screw 18, a downward movement of the wedge-like part 15 cannot take place to a material or substantial extent, since any tendency toward such downward movement has the effect of wedging the part 15 tighter between the wall face and the head of the screw 18.

Having adjusted the two brackets to the right vertical positions, to give the desired height of the fixture 10, as determined by the ends of the connecting pipes, the fixture 10 is then positioned or shifted in a horizontal plane in such directions as may be necessary or may be permitted by such leeway as the pipes and the holes in the fixture permit, thus to achieve a final position of the fixture 10, preferably one in which its rear edge is parallel to the wall 11, it being noted that the general position in these respects of the fixture 10 became determined when the fixture was initially let down or set onto the pipe connections as earlier above noted. With the final position determined, the device 20 of each bracket is shifted along the horizontal bracket portion 14 to bring the arm portion 20ᵇ into engagement with the outer face of the apron 10ª, whence the screw 24 is now rotated to advance it toward the left relative to the threaded lug end 25 and to bring its left-hand end into threaded engagement with the hole 20ᵉ. Once the screw is threaded into the hole 20ᵉ of the device 20, the position of the latter lengthwise of its supporting bracket portion 14 becomes fixed, the screw 24 thereafter acting as a compression and tension member to resist movement of the device 20 in a direction to the right or left, as viewed in Figure 2. Continued rotation of the screw thereupon advances the screw bodily relative to both the threaded arm portion 20ᶜ and the threaded bracket portion 25, bringing its free end ultimately into engagement with the inner face of the apron 10ª, whence tightening up of the screw 24 clamps the apron securely between the end of the screw and the arm portion 20ᵇ. Where a cushioning member like the element 22 is employed, marring of the external finished surface of the fixture 10 is more effectively prevented while the element 22, depending upon its composition, may act resiliently under compression to aid in maintaining secure the grip of the parts upon the fixture 10. Preferably, also, the locknut 26 is tightened up thus to lock the screw 24 in its clamping position.

In this form it will be seen that it is preferred to have the weight or load represented by the lavatory 10 or other fixture transmitted directly to the bracket, thus relieving the screw or clamping structure from having to transmit such a load and thus permitting lighter construction for these parts. Shifting in a direction toward or away from the wall 1 is dependably precluded by the screw 24 which, as above noted, acts as a compression and tension member to resist such shifting. Displacement of the fixture 10 in a direction toward or away from the observer, viewing Figure 2, is resisted by the interfitting of the device 20 with the bracket portion 14.

Also, it might be noted that the action of the device is thoroughly dependable. For example, if in manufacture of the device variations in dimension of the parts occur, particularly where the bracket structure 14 and the device 20 are in the form of castings, the action and convenience of the device may be adequately realized even if, for example, the threaded connection between the device 20 and the screw 24 is such as would hold the device 20 with the under edges of the enlargements of the portions 20ᵇ and 20ᶜ (see Figure 3) thereof out of engagement with the upper face 14ª. In such case, dependable securing of the fixture 10 may still be achieved since, as in the preferred arrangement, the device 20 need not take part in transmitting the weight or load of the fixture 10 to the bracket, since the apron 10ᵃ preferably rests directly upon the bracket portion 14.

The bracket structure is operable with other forms of plumbing fixtures. By way of illustration of one such other form, in Figure 4ᵃ I have shown the fixture 10 with a different form of apron 10ᵇ; thus, for example, where the sink, lavatory, or the like, is made up of heavy sheet metal externally enameled or otherwise finished, it is usual to have the peripheral flange or apron 10ᵇ provided with an inturned flange 10ᶜ that acts as a strengthening rib. In Figure 4ᵃ I have shown the bracket of Figure 2 with such a construction related to it and preferably the clearance between the screw 24 and the upper face 14ᵃ of the bracket portion 14 is sufficient to accommodate therein the inturned flange 10ᶜ, thus to bring the end of the clamping screw 24 into engagement with the inner face of the vertical apron 10ᵇ to clamp the latter against the part 20ᵇ of the device 20.

In the form or embodiment shown in Figures 5 and 6, the bracket structure, generally indicated by the reference character 27, is in general the same as the bracket structure 13 of Figure 2 but without the upstanding threaded abutment or extension 25; it has, therefore, a horizontal bracket portion 28 with a wedge-shaped or tapered vertical portion 30 to rest against the wall 11 and secured thereto preferably by a screw 31 operating in a vertical slot 32, while the horizontal bracket portion 28 is provided with a centrally and longitudinally extending slot or channel 33, like the channel 21 of Figures 2 and 3, though preferably parallel-faced. In this channel 33 is accommodated the lower portion of a device 34 constructed in general like the device 20 of Figure 2; it is U-shaped and its horizontal portion 34ᵃ is preferably accommodated within the channel 33 and below the upper face 28ᵃ of the bracket portion 28 and projecting above the face 28ᵃ are the enlarged ends of the arm portions 34ᵇ and 34ᶜ. The arm portion 34ᵇ may be provided with a cushioning element 22 and arm 34ᶜ has a threaded hole in which is threaded a screw 35 whose head 35ᵃ is suitably shaped to permit operation of the screw by wrench, screwdriver, or the like; on screw 35 is preferably a locknut 36.

Installation of the bracket and the fixture proceeds in general in the sequences above-described in connection with the bracket of Figures 2-4. Thus, the device 34, with the screw 35 backed off to leave sufficient space between its free end and the arm portion 34ᵇ, may be shifted horizontally lengthwise of its supporting bracket portion 28 to permit entry of the apron 10ᵇ between the arm 34ᵇ and the end of the screw 35 and into engagement with the upper face of the bracket portion 28, and when final determination of the position of the various parts, such as the vertical position of the bracket 27 and the position of the fixture 10 in its horizontal plane, has been made, the screw 35 may be turned home to clamp apron 10ᵃ against the arm portion 34ᵇ of the device 34, and the locknut 36 set to lock the screw. Thereupon, in one possible method of application, the device 34 is fixed against shifting relative to the bracket portion 28 and for this purpose a possible and preferred arrangement might comprise an apertured plate or washer 38 resting against the under face of the bracket portion 28 and in effect being bridged across the channel 33; through the aperture in the plate 38 extends a threaded stud or shank 39 preferably formed integrally with the U-shaped part 34 and preferably depending centrally from the horizontal portion 34ᵃ of the device 34 and preferably with its axis in a vertical plane midway between the shouldered enlarged ends of the arms 34ᵇ and 34ᶜ. The threaded shank 39 has threaded onto it a nut 40 which, when tightened up, accordingly fixes the device 34 against shifting relative to the horizontal bracket portion 28 and in the illustrative form effects a clamping of the device 34 in position by clamping the two parts of the bracket portion 28 that are to either side of the channel or slot 33 between the clamping plate or washer 38 and the shoulders on each of the enlarged ends of the arms 34ᵇ and 34ᶜ and which shoulders, as is better shown in Figure 6, overlie the upper faces of the two parts of the bracket portion 28 to either side of the channel 33. If desired, a locknut 40ᵃ may also be employed. By such an arrangement a secure anchorage of the device 34 is achieved and again it will be noted that it is possible to transmit the load or weight represented by the fixture 10 directly to the bracket structure, permitting the various securing devices just described to be made smaller and lighter.

To illustrate that the bracket structure of Figures 5 and 6 is operable with other forms of fixture constructions, Figure 6ᵃ shows the bracket structure related to a fixture, such as a lavatory of the type shown in Figure 4ᵃ, having a vertical flange or apron 10ᵇ and an inturned flange or rib 10ᶜ. In such case, it is preferred that the clearance between the screw 35 and the part against which the apron rests is sufficient to accommodate therebetween the rib 10ᶜ, screw 35 in such case engaging the inner face of the apron 10ᵇ to press it against the coacting arm portion 34ᵇ.

Turning now to Figures 7 and 8, the bracket structure, in the form there shown, may be the same as the bracket 27 of Figures 5-6, and in Figures 7 and 8 is so designated together with corresponding parts. In the slot or channel 33 extends the shank 41ᵃ of a securing device generally indicated by the reference character 41, the device being in general T-shaped and having a head 41ᵇ which is preferably elongated, being illustratively oval-shaped, as indicated in Figure 8. In expanse the head 41ᵇ is sufficient to prevent the device 41 from passing downwardly through the slot or channel 33 no matter what rotary position it assumes relative to the bracket portion 28. At its ends the head 41ᵇ has two upstanding members 42 and 43, the spacing between which is sufficient to accommodate the thickest apron or like part of a plumbing fixture. The lower portion of the shank 41ᵃ is threaded as at 41ᶜ to take a nut 44 threaded onto the shank after an apertured clamping plate or washer 45 is slipped onto the shank.

In installation, the bracket is secured to the wall 11 by the screw 31 to the approximate desired height, the piping is built up, the device 41, with the nut 44 loose, is positioned so that the major axis or longitudinal dimension of the head 41ᵇ extends lengthwise of the bracket portion 28, and the plumbing fixture is then set over the pipe connections and its apron 10ᵃ brought to rest on the head 41ᵇ of the device 41 and in between the upstanding members 42 and 43, the device 41 being manually shifted along the bracket portion 28 to a suitable position to permit entry of the apron 10ᵃ in between the juxtaposed parts 42 and 43. Suitable vertical setting of the bracket (usually of two of them as earlier above indicated) is then effected and the screw 31 tightened up to secure the bracket 27 in the final vertical position. The fixture 10 is then shifted in its horizontal plane to the extent permitted or required to give it its final setting or alinement in its horizontal plane relative to the wall 11, whence the device 41 is twisted about the axis of shank 41ᵃ in the same direction in which the nut 44 is turned to tighten it (counter-clockwise, as viewed in Figure 8), thus bringing the member 42 into engagement with the outer face of the apron 10ᵃ and the member 43 into engagement with the inner face of the apron, as shown in Figure 8. The weight or load represented by the fixture 10 is distributed or transmitted to the bracket portion 28 by or through the head 41ᵇ of the device 41, and upon tightening up the nut 44, thus to clamp the two parts of the bracket portion 28, that are to each side of the slot or channel 33 between the shoulders formed by the head 41ᵇ, which overlie the upper face thereof, and the clamping plate 45. In tightening up the nut 44, the shank 41ᵃ and through it the entire device 41 is subjected to the torque imposed upon it by the tightening up of the nut 44, that torque acting in counter-clockwise direction, as viewed in Figure 8, and this torque is effective to cause the members 42 and 43 to grip the apron 10ᵃ therebetween, thus clamping the apron by a clamping pressure exerted transversely of the apron and hence horizontally.

If desired, and preferably, member 42 is provided with a cushioning element 46 of fiber, rubber, or other suitable relatively yieldable material to act in a manner generally similar as described in connection with the element 22 of Figures 2 and 5; in the form of Figures 7 and 8 the element 46 may be in the form of a sleeve fitted over and preferably secured to and about the upstanding part 42, thus to cushion the engagement of the latter with the outer finished face of the apron.

Should the lavatory or like fixture 10 have a vertical flange or apron 10ᵇ and an inturned flange or rib 10ᶜ, as shown in Figure 8a, the actions just described in connection with Figures 7 and 8 may be made to take place and, if desired, the inturned flange or rib 10ᶜ, resting with its under face upon the head 41ᵇ between the upstanding parts 42, 43, may be gripped between the parts 42, 43, the part 42 preferably equipped with the cushioning device 46 engaging the outer face of the apron 10ᵇ and the member 43 engaging the inner horizontal edge of the rib 10ᶜ.

Many thoroughly practical advantages are achieved. For example, the structures will be seen to have a desirable flexibility particularly as to method of installation, and in this connection it is to be noted that the sequences of steps of installation outlined above are illustrative and may be widely varied according to the particular circumstances met with in practice. Furthermore, it will be seen that the invention makes it possible to greatly simplify and to reduce the time and labor involved in completing a lavatory installation like that of Figure 1, and that I am enabled to avoid and eliminate troublesome and expensive cut and try methods of present-day and prior practices. Also, it will be noted that it is possible to avoid subjecting the fastening of the bracket to the wall to strains other than those caused by the weight or load represented by the plumbing fixture, such as a lavatory; for example, the fastening or clamping of the vertical apron may be effected by forces operating in directions (horizontally in the illustrative forms) substantially devoid of components that would cause straining of the bracket per se or of its fastening to the wall as by the screw 18 of Figures 1-4 or the screw 31 of Figures 5 and 7.

Also, it will be seen that I am enabled to use a bracket structure that can be made of short horizontal length since in most or usual instances the spacing of the rear apron from the wall is desirably made relatively small and hence the load transmitted to the bracket may be made to operate through a relatively short lever arm, permitting the bracket structure to be built smaller and lighter and more compact, without sacrifice of required strength, and hence also achieving economy of manufacture. Moreover, the construction makes for neatness of appearance, occupies little space by itself and, furthermore, does not obstruct the space underneath the plumbing fixture (see Figure 1), thus making for better accommodation under the fixture of various articles, such as cabinets, hampers, etc. Moreover, it will be seen that the invention is of a thoroughly practical nature and is well adapted to meet the widely varying conditions of hard practical use.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A bracket construction for a plumbing fixture like a lavatory that has a depending part like an apron or flange, comprising a supporting bracket having a horizontal portion and means for fixedly securing the supporting bracket to a supporting structure such as a wall so that its said portion extends substantially horizontally, said horizontal portion having a length within the range of possible positions of said depending part according to the position of said lavatory relative to said supporting structure, whereby said depending part overlies said horizontal portion at some point within the length of the latter, and said horizontal portion having means forming a guideway extending in a direction lengthwise thereof, means having a part accommodated in said guideway means and shiftable therealong and having two spaced parts extending upwardly beyond the upper face of said horizontal portion and between the ends of the latter, the range of shiftability being within the length of said horizontal portion, whereby said second-mentioned means may be shifted to bring said two spaced parts substantially to the aforesaid point to receive therebetween the overlying depending part of said plumbing fixture, and means for fixing the position of said second-mentioned means lengthwise of said guideway-forming means and within the length of said horizontal portion and for effecting a gripping of said depending part between said two upstanding spaced parts.

2. A construction as claimed in claim 1 in which said second-mentioned means is in the form of a substantially U-shaped member whose two arms form said two spaced upstanding parts, one of said arms having a threaded hole and said horizontal bracket portion having a part containing a threaded hole axially alined with said first-mentioned threaded hole, and said last-mentioned means comprising a screw threaded through both of said threaded holes.

3. A construction as claimed in claim 1 in which said second-mentioned means is in the form of a substantially U-shaped member whose two arms form said two spaced upstanding parts, said last-mentioned means comprising means for giving said U-shaped member rotary movement to cause the two arms thereof to grip said depending part therebetween and means for holding said U-shaped member in its turned position and against movement lengthwise along said guideway-forming means.

4. A construction as claimed in claim 1 in which said guideway means is in the form of a slot along said horizontal portion and said second-mentioned means is in the form of a substantially T-shaped member whose shank portion extends into said slot and whose cross part has two spaced upward projections to form said two spaced upstanding parts, said last-mentioned means comprising means coacting with one of said upstanding parts to clamp said depending fixture part against the other of said upstanding parts and means coacting with said shank portion for securing said T-shaped member against movement lengthwise of said guideway-forming means.

5. A construction as claimed in claim 1 in which said second-mentioned means is in the form of a substantially U-shaped member whose two arms form said two spaced upstanding parts, said guideway-forming means comprising a channel extending centrally and lengthwise of said horizontal bracket portion, the horizontal portion of said U-shaped member being accommodated in said channel with its upper edge at or below the upper face of said bracket horizontal portion, whereby said depending fixture part rests directly upon said horizontal bracket portion.

6. A bracket construction for a plumbing fixture like a lavatory that has a depending part like an apron or flange, comprising a supporting bracket having means for mounting it to sustain a vertical load and having a horizontal supporting portion of greater dimension than the thickness of said depending lavatory part and having the latter extending above and transversely of said horizontal portion, whereby said plumbing fixture, in course of installation, may be adjusted or shifted in directions lengthwise and crosswise of said horizontal supporting portion with said depending part over the latter, a device presenting two spaced members exposed upwardly from said horizontal portion for reception therebetween of said depending lavatory part, said device being movable lengthwise of said horizontal portion according to the position into which said plumbing fixture is shifted, and a single means for effecting a gripping of said depending part between said two spaced member and holding said device against shifting movement lengthwise of said horizontal portion.

7. A bracket construction for a plumbing fixture like a lavatory that has a depending part like an apron or flange, comprising a supporting bracket having means for mounting it to sustain a vertical load and having a horizontal supporting portion of greater dimension than the thickness of said depending lavatory part and having the latter extending transversely of said horizontal portion, whereby said plumbing fixture, in course of installation, may be adjusted or shifted in directions lengthwise and crosswise of said horizontal supporting portion, said horizontal portion having adjacent an end thereof an upstanding lug having a threaded hole therein, the axis of which is lengthwise of said horizontal portion, a device movable lengthwise relative to said horizontal portion and presenting two spaced upstanding parts between which said depending lavatory part is received, that one of said two upstanding parts that is nearer to said lug having a threaded hole therein, and a single screw threaded first through said lug and then, according to the position of said device lengthwise of said horizontal portion, threaded through the hole in said nearer upstanding part with its end clamping said depending lavatory part against the other upstanding part.

8. A bracket construction for a plumbing fixture like a lavatory that has a depending part like an apron or flange, comprising a supporting bracket having means for mounting it to sustain a vertical load and having a horizontal supporting portion of greater dimension than the thickness of said depending lavatory part and having the latter extending transversely of said horizontal portion, whereby said plumbing fixture, in course of installation, may be adjusted or shifted in directions lengthwise and crosswise of said horizontal supporting portion, securing means carried by said bracket operative to secure whatever portion of said depending part is presented to it as a result of a shifting of said plumbing fixture to move the depending part transversely of said horizontal bracket portion, said horizontal bracket portion and said securing means having coacting parts whereby said securing means is shiftable lengthwise of said horizontal bracket portion to position it according to the shifting of said plumbing fixture in a direction to move its depending part lengthwise of said horizontal bracket portion, and means for securing said securing means in its shifted position and against displacement therefrom.

9. A bracket construction for a plumbing fixture like a lavatory that has a depending part like an apron or flange, comprising a supporting bracket having means for mounting it to sustain a vertical load and having a horizontal supporting portion of greater dimension than the thickness of said depending lavatory part and having the latter extending transversely of said horizontal portion, whereby said plumbing fixture, in course of installation, may be adjusted or shifted in directions lengthwise and crosswise of said horizontal supporting portion, said bracket-mounting means comprising also means for changing the height of said horizontal bracket portion, a unitary device carried by said horizontal portion and movable lengthwise of the latter according to the lengthwise shift of said depending lavatory part, said device having means for engaging said depending lavatory part, and a single threaded means coacting with both said horizontal portion and said engaging means for effecting a clamping by the latter of said depending part and for holding said device against movement lengthwise of said horizontal portion.

10. A wall support for a plumbing fixture like a lavatory that has a depending part like an apron or flange and which requires setting in a vertical direction and setting in directions toward or away from the wall and lengthwise of the wall according to the piping that is built up for the plumbing fixture, said wall support comprising means for directly engaging and securing said depending part at any point in the length of said depending part as determined by a shift of said plumbing fixture in the general direction lengthwise of said wall, and means mounting said first-mentioned means from said wall and comprising a bracket having a vertical portion to rest against the wall, said vertical portion having a vertically extending slot to receive therethrough wall-fastening means, said vertical portion being wedge-shaped to effect a wedge-like action and thereby resist downward shift of said bracket under its load, and a horizontal portion on said bracket for movably supporting within the limits of its length said first-mentioned means for movement lengthwise thereof and means for fixing the position of said first-mentioned means relative to said horizontal portion according to the desired shift of said plumbing fixture in a direction toward or away from said wall.

11. A bracket construction comprising an elongated supporting member and a fastening means intermediate the ends of said elongated supporting member, said member and said fastening means having coacting parts whereby said fastening means is positionable in any one of a plurality of positions relative to said member within the length of said supporting member, said fastening means having two spaced parts in the space between which is received the part to be fastened, and means for securing said fastening means in a selected one of said aforesaid plurality of positions relative to said member and for holding the part received between said two spaced parts against movement relative to the latter.

12. A bracket construction as claimed in claim 11 in which said securing and holding means comprises a single screw, one of said two spaced parts having a threaded hole and said member having a threaded hole alined with said just-mentioned threaded hole in the direction of relative movement between said fastening means and said member.

13. A bracket construction as claimed in claim 11 in which said securing and holding means comprises a means for clamping the part received between said two parts and means coacting between said member and said fastening means for securing said fastening means against movement out of the selected one of the aforesaid plurality of positions.

14. A bracket construction as claimed in claim 11 in which said securing and holding means comprises means for lessening the effective spacing between said two spaced parts and thereby cause them to hold the part received therebetween, the means holding said fastening means in its selected position acting also to hold said parts against increase in the effective spacing therebetween, 15. A bracket construction comprising an elongated supporting member having a slot extending lengthwise thereof, and a fastening means, said fastening means being U-shaped in form with the horizontal portion extending into the space between the side portions of said supporting member that are to either side of said slot and with its two arms upstanding beyond the face of said elongated supporting member to receive therebetween the part to be fastened, said supporting member having upstanding means having a hole the axis of which is substantially alined with said two arms, that one of said two arms that is nearer said upstanding means having a threaded hole alined with said first-mentioned hole, and a screw extending through said first-mentioned hole and threaded through the hole in said one arm to clamp the part to be fastened against the other arm.

16. A bracket construction for a plumbing fixture like a lavatory that has a depending part like an apron or flange, comprising a supporting bracket having means for mounting it to sustain a vertical load and having a horizontal supporting portion of greater dimension than the thickness of said depending lavatory part and having the latter extending transversely of said horizontal portion, whereby said plumbing fixture, in course of installation, may be adjusted or shifted in directions lengthwise and crosswise of said horizontal supporting portion, said horizontal portion having a slot extending lengthwise thereof and having adjacent an end thereof an upstanding lug with a threaded hole therein, a device carried by said horizontal portion and comprising means extending into said slot and having two parts spaced lengthwise of said horizontal portion and projecting above the latter to receive said depending lavatory part between, said device being shiftable lengthwise of said horizontal portion according to the position of said depending lavatory part lengthwise of said horizontal portion, that one of said two spaced parts that is nearer said upstanding lug having a threaded hole, and a screw threaded through both of said holes.

17. A bracket construction comprising a supporting member having a threaded hole with a screw threaded therethrough, and a fastening means shiftable relative to said supporting member in the direction of the axis of said screw, said fastening means having a threaded hole into which said screw is threaded after completion of shift of said fastening means in said direction, thereby to fix the position of said fastening means relative to said supporting member, said fastening means comprising means coacting in response to continued threading of said screw relative to both of said threaded holes to clamp the part to be fastened.

MICHAEL A. CROZIER.